US012659660B2

(12) United States Patent
Chen et al.

(10) Patent No.: US 12,659,660 B2
(45) Date of Patent: Jun. 16, 2026

(54) DYNAMIC CORRECTION METHOD FOR SOUND RECEPTION AND ELECTRONIC SYSTEM

(71) Applicant: Chicony Electronics Co., Ltd., New Taipei City (TW)

(72) Inventors: Chien-Yueh Chen, New Taipei City (TW); Min-Wei Yeh, New Taipei City (TW); Yu-Hsuan Liu, New Taipei City (TW)

(73) Assignee: Chicony Electronics Co., Ltd., New Taipei City (TW)

(*) Notice: Subject to any disclaimer, the term of this patent is extended or adjusted under 35 U.S.C. 154(b) by 266 days.

(21) Appl. No.: 18/416,920

(22) Filed: Jan. 19, 2024

(65) Prior Publication Data

US 2025/0097638 A1 Mar. 20, 2025

(30) Foreign Application Priority Data

Sep. 18, 2023 (TW) ................................ 112135463

(51) Int. Cl.
*H04R 3/04* (2006.01)
*H04R 3/12* (2006.01)
*H04R 29/00* (2006.01)

(52) U.S. Cl.
CPC ................ *H04R 3/04* (2013.01); *H04R 3/12* (2013.01); *H04R 29/002* (2013.01); *H04R 2430/01* (2013.01)

(58) Field of Classification Search
CPC ...... H04R 29/001; H04R 29/004; H04R 3/04; H04R 2430/01
See application file for complete search history.

(56) References Cited

U.S. PATENT DOCUMENTS

2006/0128442 A1* 6/2006 Cho ................. H04M 1/72403 455/569.1
2007/0223736 A1* 9/2007 Stenmark .............. H03G 5/005 381/103

FOREIGN PATENT DOCUMENTS

CN 116744206 9/2023

OTHER PUBLICATIONS

"Office Action of Taiwan Counterpart Application", issued on Sep. 9, 2024, p. 1-p. 9.

* cited by examiner

*Primary Examiner* — James K Mooney
(74) *Attorney, Agent, or Firm* — JCIPRNET

(57) ABSTRACT

A dynamic correction method for sound reception is adapted for an electronic device. The electronic device includes an audio processor, a microphone signally connected to the audio processor and a sound reception hole corresponding to the microphone. The dynamic correction method for sound reception includes the following steps: the audio processor obtains a first airtight numerical curve according to a numerical difference value between a first frequency response curve and a second frequency response curve to execute a first dynamic correction sound reception program; and the audio processor executes the first dynamic correction sound reception program to obtain an adjusted second frequency response curve.

22 Claims, 8 Drawing Sheets

10

DYNAMIC CORRECTION METHOD FOR SOUND RECEPTION AND ELECTRONIC SYSTEM

CROSS-REFERENCE TO RELATED APPLICATION

This application claims the priority benefit of Taiwan application serial no. 112135463, filed on Sep. 18, 2023. The entirety of the above-mentioned patent application is hereby incorporated by reference herein and made a part of this specification.

BACKGROUND

Technical Field

The disclosure relates to a dynamic correction method and an electronic system, and in particular, to a dynamic correction method for sound reception and an electronic system.

Description of Related Art

When receiving sound, the microphone of an electronic device may receive non-linear transmitted sound energy that causes structural vibration due to sound energy, thus affecting the sound reception effect. It is conventional to reduce the non-linear transmitted sound energy by adding a shock-absorbing structure to the electronic device or increasing the airtight numerical value of the stacked structure in front of and behind the microphone. However, the above methods all require increased material costs and make the structure of the electronic device more complex.

SUMMARY

The disclosure provides a dynamic correction method for sound reception, which may dynamically correct sound reception without additional material costs.

The disclosure provides an electronic system that may execute the above method.

A dynamic correction method for sound reception of the disclosure is adapted for an electronic device. The electronic device includes an audio processor, a microphone signally connected to the audio processor and a sound reception hole corresponding to the microphone. The dynamic correction method for sound reception includes the following steps: the audio processor obtains a first airtight numerical curve according to a numerical difference value between a first frequency response curve and a second frequency response curve to execute a first dynamic correction sound reception program; and the audio processor executes the first dynamic correction sound reception program to obtain an adjusted second frequency response curve.

In an embodiment of the disclosure, when the sound reception hole remains unobstructed, the microphone receives a sound emitted by a first speaker and obtains the first frequency response curve; when the sound reception hole is closed, the microphone receives the sound emitted by the first speaker and obtains the second frequency response curve.

In an embodiment of the disclosure, the first dynamic correction sound reception program includes: in at least one frequency range in which a decibel value is a negative number in the first airtight numerical curve, the audio processor reduces the decibel value of the second frequency response curve in the at least one frequency range to obtain the adjusted second frequency response curve. The decibel value of the adjusted second frequency response curve in the at least one frequency range is less than or equal to the decibel value of the first frequency response curve in the corresponding at least one frequency range.

In an embodiment of the disclosure, the decibel value of the adjusted second frequency response curve in the at least one frequency range is 0 to 15 decibels smaller than the decibel value of the first frequency response curve in the corresponding at least one frequency range.

In an embodiment of the disclosure, the at least one frequency range includes multiple frequency ranges, and the audio processor respectively reduces the decibel values of the second frequency response curve in the frequency ranges according to multiple difference values between the first frequency response curve and the second frequency response curve in the frequency ranges to obtain the adjusted second frequency response curve.

In an embodiment of the disclosure, the at least one frequency range includes multiple frequency ranges, and the audio processor reduces the decibel values of the second frequency response curve in the frequency ranges according to a maximum difference value among multiple difference values between the first frequency response curve and the second frequency response curve in the frequency ranges to obtain the adjusted second frequency response curve.

In an embodiment of the disclosure, the first speaker is disposed in the electronic device.

In an embodiment of the disclosure, the dynamic correction method for sound reception further includes: when the sound reception hole remains unobstructed, the microphone receives a sound emitted by a second speaker and obtains a third frequency response curve; when the sound reception hole is closed, the microphone receives the sound emitted by the second speaker and obtains a fourth frequency response curve; the audio processor obtains a second airtight numerical curve according to a numerical difference value between the third frequency response curve and the fourth frequency response curve to execute a second dynamic correction sound reception program; and the audio processor obtains an adjusted fourth frequency response curve by executing the second dynamic correction sound reception program.

In an embodiment of the disclosure, the second dynamic correction sound reception program includes: in at least one frequency range in which a decibel value is a negative number in the second airtight numerical curve, the audio processor reduces the decibel value of the fourth frequency response curve in the at least one frequency range to obtain the adjusted fourth frequency response curve. The decibel value of the adjusted fourth frequency response curve in the at least one frequency range is less than or equal to the decibel value of the third frequency response curve in the corresponding at least one frequency range.

In an embodiment of the disclosure, in the second dynamic correction sound reception program, the decibel value of the adjusted fourth frequency response curve in the at least one frequency range is 0 to 15 decibels smaller than the decibel value of the third frequency response curve in the corresponding at least one frequency range.

In an embodiment of the disclosure, the at least one frequency range includes multiple frequency ranges, and the audio processor respectively reduces the decibel values of the fourth frequency response curve in the frequency ranges according to multiple difference values between the third frequency response curve and the fourth frequency response curve in the frequency ranges to obtain the adjusted fourth frequency response curve.

In an embodiment of the disclosure, the at least one frequency range includes multiple frequency ranges, and the audio processor reduces the decibel values of the fourth frequency response curve in the frequency ranges according to a maximum difference value among multiple difference values between the third frequency response curve and the fourth frequency response curve in the frequency ranges to obtain the adjusted fourth frequency response curve.

In an embodiment of the disclosure, one of the first speaker and the second speaker is located in the electronic device, and the other is located outside the electronic device.

An electronic system of the disclosure includes an electronic device, and the electronic device includes an audio processor, a microphone and a sound reception hole. The microphone is signally connected to the audio processor. The sound reception hole corresponds to the microphone. The audio processor obtains a first airtight numerical curve according to a numerical difference value between a first frequency response curve and a second frequency response curve to execute a first dynamic correction sound reception program and obtain an adjusted second frequency response curve.

In an embodiment of the disclosure, the electronic system further includes a first speaker. When the sound reception hole remains unobstructed, the microphone receives a sound emitted by the first speaker and obtains the first frequency response curve; when the sound reception hole is closed, the microphone receives the sound emitted by the first speaker and obtains the second frequency response curve.

In an embodiment of the disclosure, in at least one frequency range in which a decibel value is a negative number in the first airtight numerical curve, the audio processor reduces the decibel value of the second frequency response curve in the at least one frequency range to obtain an adjusted second frequency response curve. The decibel value of the adjusted second frequency response curve in the at least one frequency range is less than or equal to the decibel value of the first frequency response curve in the corresponding at least one frequency range.

In an embodiment of the disclosure, the audio processor makes the decibel value of the adjusted second frequency response curve in the at least one frequency range 0 to 15 decibels smaller than the decibel value of the first frequency response curve in the corresponding at least one frequency range.

In an embodiment of the disclosure, the electronic system further includes a second speaker. One of the first speaker and the second speaker is located in the electronic device, and the other is located outside the electronic device. When the sound reception hole remains unobstructed, the microphone received a sound emitted by the second speaker, so that the audio processor obtains a third frequency response curve. When the sound reception hole is closed, the microphone receives the sound emitted by the second speaker, so that the audio processor obtains a fourth frequency response curve. In addition, the audio processor obtains a second airtight numerical curve according to a numerical difference value between the third frequency response curve and the fourth frequency response curve so execute a second dynamic correction sound reception program and obtain an adjusted fourth frequency response curve.

In an embodiment of the disclosure, in at least one frequency range in which a decibel value is a negative number in the second airtight numerical curve, the audio processor reduces the decibel value of the fourth frequency response curve in the at least one frequency range to obtain an adjusted fourth frequency response curve. The decibel value of the adjusted fourth frequency response curve in the at least one frequency range is less than or equal to the decibel value of the third frequency response curve in the corresponding at least one frequency range.

In an embodiment of the disclosure, the audio processor makes the decibel value of the adjusted fourth frequency response curve in the at least one frequency range 0 to 15 decibels smaller than the decibel value of the third frequency response curve in the corresponding at least one frequency range.

In an embodiment of the disclosure, the electronic system further includes a remote device, which is signally connected to the audio processor, and the audio processor receives a sound signal from the remote device, and transmits the sound signal to the first speaker or the second speaker in the electronic device for playing.

In an embodiment of the disclosure, the electronic device includes a storage, which is electrically connected to the audio processor, and the storage is configured to store the first airtight numerical curve.

Based on the above, in the electronic system and the dynamic correction method for sound reception of the disclosure, the audio processor obtains the first airtight numerical curve according to the numerical difference value between the first frequency response curve and the second frequency response curve to execute the first dynamic correction sound reception program, and the audio processor obtains the adjusted second frequency response curve by executing the first dynamic correction sound reception program. If the second frequency response curve is a curve that can reflect the non-linear transmitted sound energy, since the adjusted second frequency response curve has a relatively low impact on the first frequency response curve, the impact of non-linear transmitted sound energy on the sound reception effect caused by the non-linear transmitted sound energy may be effectively reduced without requiring additional material costs.

DESCRIPTION OF THE EMBODIMENTS

Figure 1:
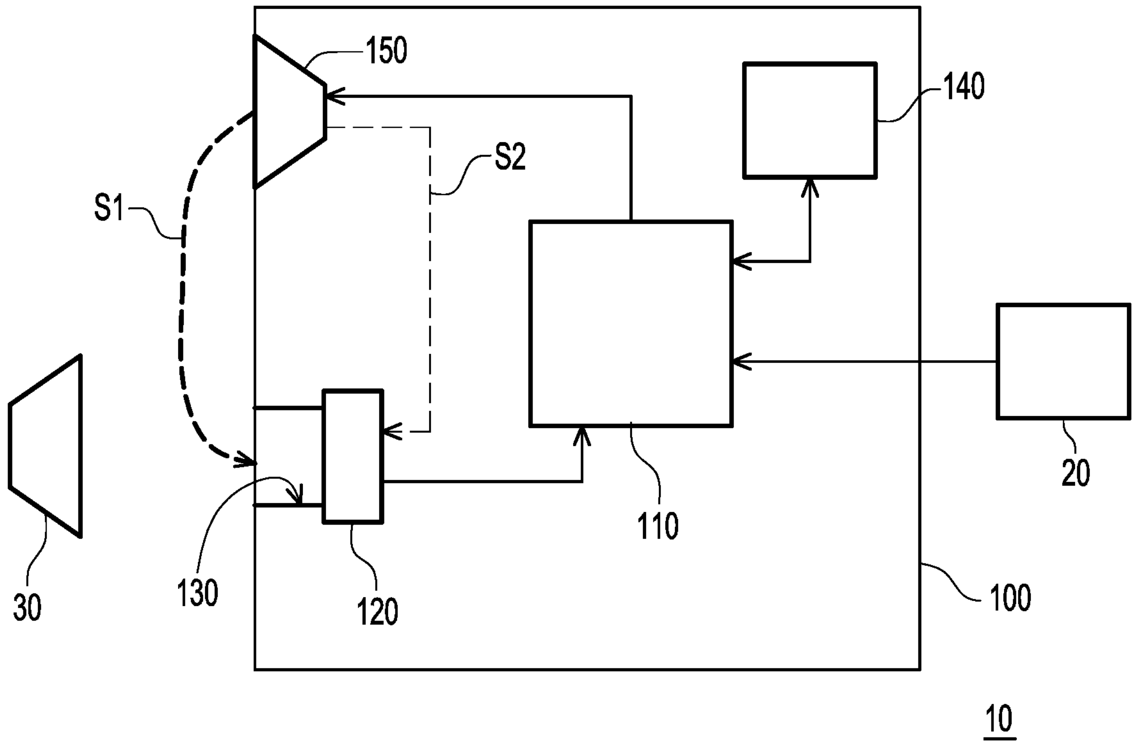
FIG. 1 is a schematic diagram of an electronic system according to an embodiment of the disclosure.

For the convenience and clarity of description, the thickness or size of each element in the drawings is exaggerated, omitted or schematically expressed to facilitate the understanding and reading of those familiar with this art. Moreover, the size of each element is not entirely the actual size, and is not used to limit the conditions for the implementation of the disclosure, thereby having no technical substantive significance. Any structural modifications, changes in proportions, or adjustments in size that will not affect the effects that the disclosure can produce, and the purpose that can be achieved should still fall within the scope of the technical content disclosed in the disclosure. The same reference numbers will be used throughout the drawings to refer to the same or similar elements.

FIG. 1 is a schematic diagram of an electronic system according to an embodiment of the disclosure. Referring to FIG. 1, an electronic system 10 of the embodiment includes an electronic device 100 and a first speaker 150. The electronic device 100 takes a monitorable intercom installed at the door as an example, but the type of the electronic device 100 is not limited thereto. The electronic device 100 includes an audio processor 110, a microphone 120 and a sound reception hole 130. The microphone 120 is signally connected to the audio processor 110. The sound reception hole 130 may be disposed corresponding to the position of the microphone 120. In the embodiment, the first speaker 150 is located in the electronic device 100, is an internal speaker of the electronic device 100, and is signally connected to the audio processor 110. However, the type of the first speaker 150 is not limited thereto.

The electronic system 10 further includes a remote device 20, which is signally connected to the audio processor 110. The remote device 20 is, for example, a mobile phone or a tablet, but the type of the remote device 20 is not limited thereto. The audio processor 110 of the electronic device 100 may receive a sound signal from the remote device 20 and transmit the sound signal to the first speaker 150 in the electronic device 100 for playing.

When the first speaker 150 plays sound, microphone 120 will not only receive the sound entering from the sound hole 130 (as a thick dotted line S1 in FIG. 1), but also the sound energy (non-linear transmitted sound energy, as a thin dotted line S2 in FIG. 1) played by the first speaker 150 may be transmitted by the interior to the microphone 120 through the internal mechanical components (not shown) of the electronic device 100 (for example, nonlinearly transmitted sound energy may cause the internal mechanical components of the electronic device 100 to vibrate and further be transmitted to the microphone 120), thereby affecting the overall sound reception effect and quality of the microphone 120.

Figure 2:
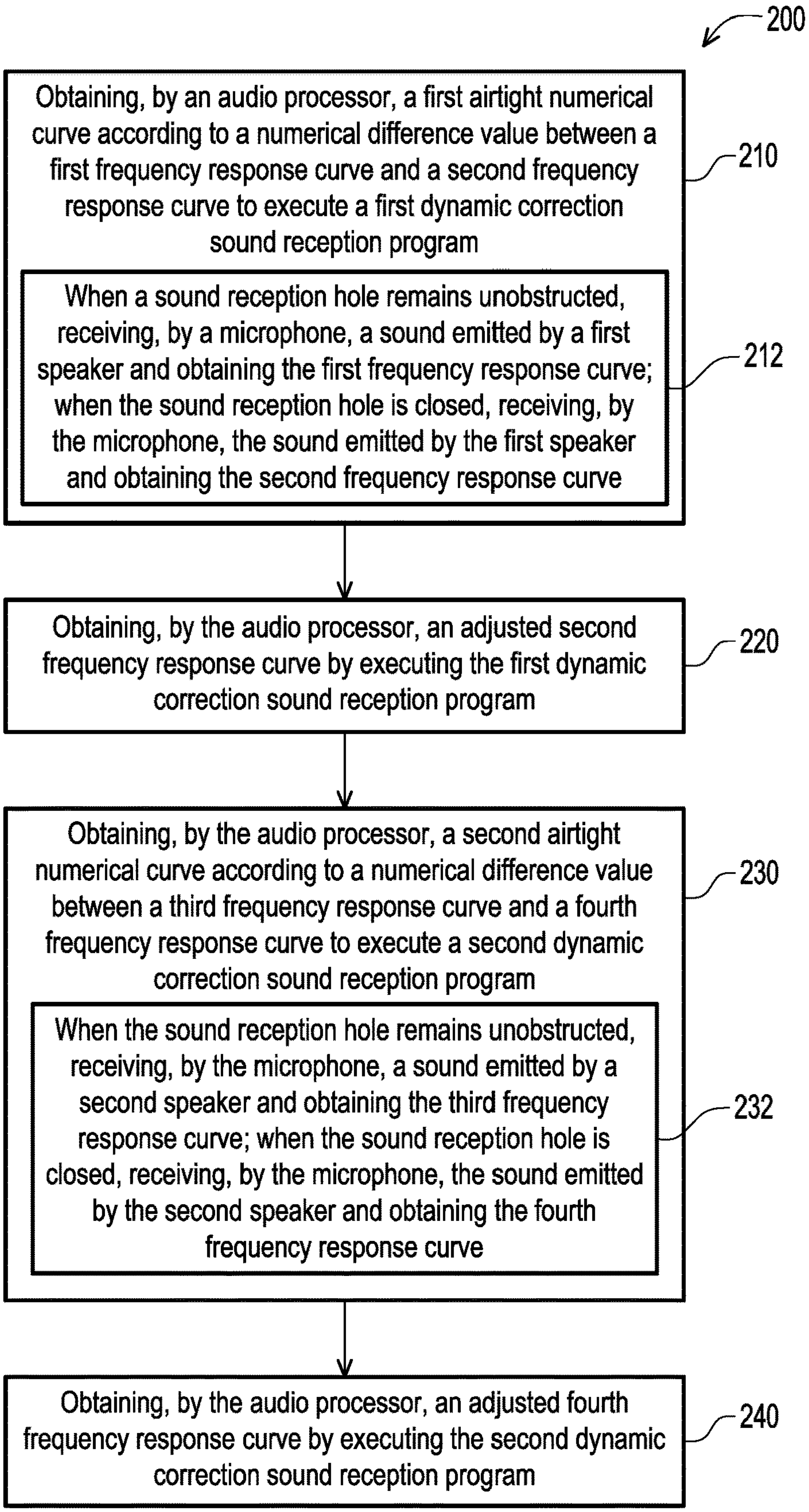
FIG. 2 is a flow chart of a dynamic correction method for sound reception according to an embodiment of the disclosure.

The electronic system 10 of the embodiment may effectively reduce the impact of the sound reception effect caused by non-linear transmitted sound energy through a dynamic correction method 200 for sound reception (FIG. 2). Such a method will be described below.

FIG. 2 is a flow chart of a dynamic correction method for sound reception according to an embodiment of the disclosure. Those of ordinary skill in the art may well understand that the dynamic correction method 200 for sound reception according to the embodiment of the disclosure is not limited to the electronic system 100 of FIG. 1, and is not limited to the order of various steps of the flow chart in FIG. 2, either. Referring to FIGS. 1 and 2, the dynamic correction method 200 for sound reception includes the following steps. First, as in step 210, the audio processor 110 obtains a first airtight numerical curve D1 (FIG. 4B) according to a numerical difference value between a first frequency response curve C1 (FIGS. 3 and 4A) and a second frequency response curve C2 (FIGS. 3 and 4A) to execute a first dynamic correction sound reception program.

Specifically, as in step 212, when the sound reception hole 130 remains unobstructed, the microphone 120 receives the sound emitted by the first speaker 150 and obtains the first frequency response curve C1; when the sound reception hole 130 is closed (for example, the sound reception hole 130 is blocked), the microphone 120 receives the sound emitted by the first speaker 150 and obtains the second frequency response curve C2.

Figure 3:
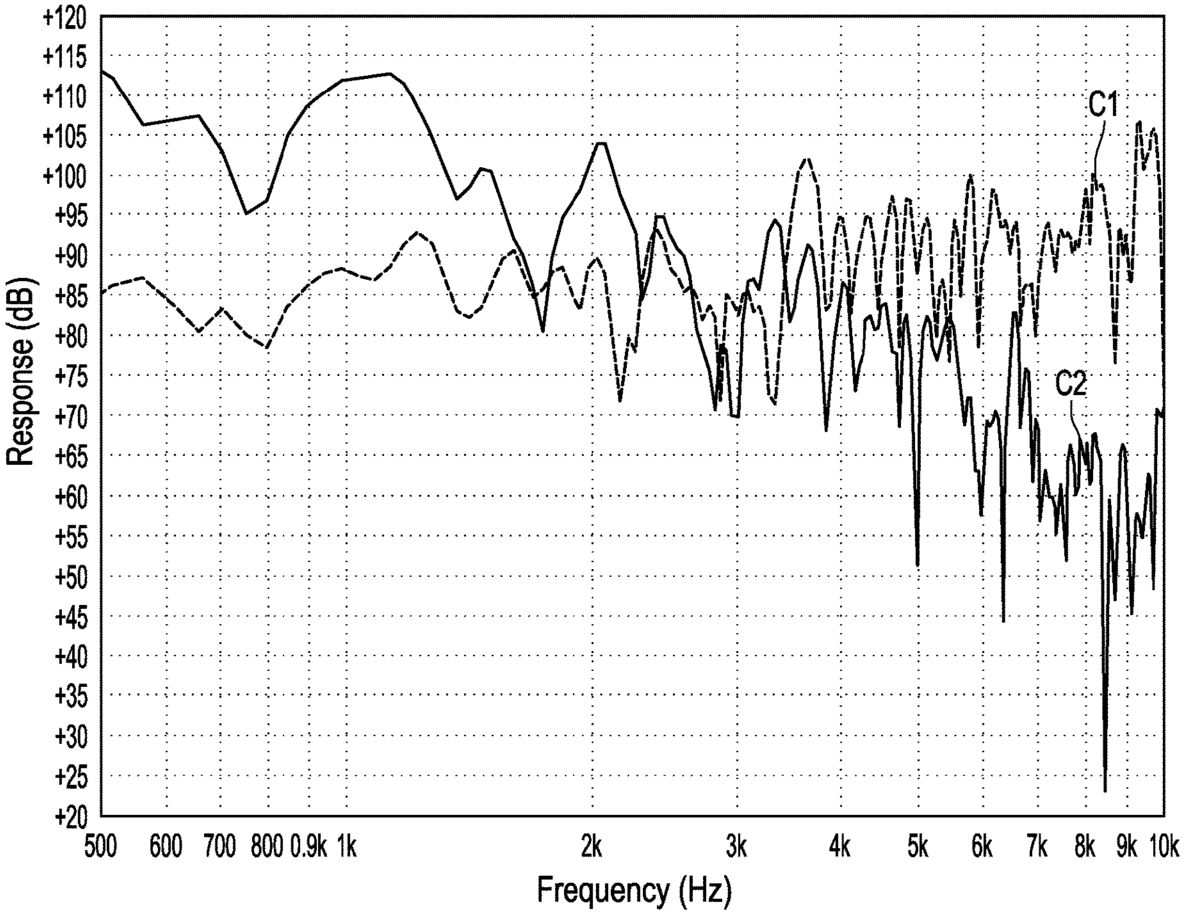
FIG. 3 is an actual measurement chart of the first frequency response curve and the second frequency response curve when the first speaker of the electronic system of FIG. 1 is operating.

FIG. 3 is an actual measurement chart of the first frequency response curve and the second frequency response curve when the first speaker of the electronic system of FIG. 1 is operating. Referring to FIG. 3, the first frequency response curve C1 is the curve of the microphone 120 receiving sound when the sound reception hole 130 remains unobstructed. That is to say, the first frequency response curve C1 represents the sum of the sound energy entering through the sound reception hole 130 (the thick dotted line S1 in FIG. 1) received by the microphone 120 and the non-linear transmitted sound energy transmitted by the interior of the electronic device 100 to the microphone 120 (the thin dotted line S2 in FIG. 1).

The second frequency response curve C2 is the curve of the microphone 120 receiving sound when the sound reception hole 130 is closed. That is to say, the second frequency response curve C2 is that the microphone 120 receives the non-linear transmitted sound energy transmitted by the interior of the electronic device 100 when the sound reception hole 130 is closed (the thin dotted line S2 in FIG. 1).

As can be seen from FIG. 3, in the frequency range from 3 KHz to 10 KHz (high frequency), the first frequency response curve C1 is located above the second frequency response curve C2, which means that in the frequency range, the non-linear transmitted sound energy transmitted by the interior of the electronic device 100 received by the microphone 120 is relatively small, so the microphone 120 is relatively less interfered by the non-linear transmitted sound energy.

On the other hand, in the frequency range from 500 Hz to 3 KHz (low frequency), the second frequency response curve C2 is located above the first frequency response curve C1, which means that in the frequency range, the non-linear transmitted sound energy transmitted by the interior of the electronic device 100 received by the microphone 120 is relatively large, so the microphone 120 is relatively much more interfered by the non-linear transmitted sound energy, thereby affecting the sound reception effect.

Since the lines of the first frequency response curve C1 and the second frequency response curve C2 in FIG. 3 are relatively complex, in order to clearly and briefly describe the dynamic correction method 200 for sound reception in the embodiment, the following will use simple curves to represent the first frequency response curve C1 and the second frequency response curve C2, and describe how to achieve dynamic correction for sound reception through the first frequency response curve C1 and the second frequency response curve C2.

Figure 4A:
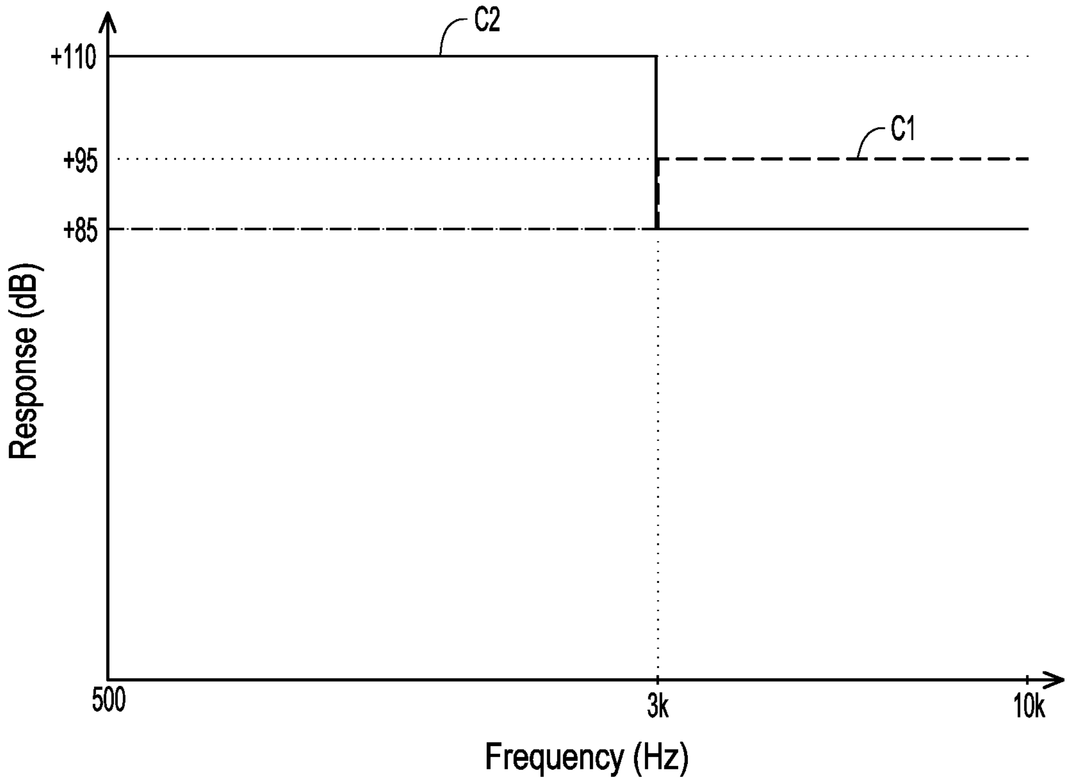
FIG. 4A is a simple schematic diagram of the first frequency response curve and the second frequency response curve when the first speaker is operating.

FIG. 4A is a simple schematic diagram of the first frequency response curve and the second frequency response curve when the first speaker is operating. It should be noted that FIG. 4A is merely illustrated with a rather simplified curve to facilitate understanding. Referring to FIG. 4A, in the frequency range from 3 KHz to 10 KHz (high frequency), the first frequency response curve C1 is located above the second frequency response curve C2. In the frequency range, the decibel value of the response of the first frequency response curve C1 is taken as 95 dB as an example, and the decibel value of the response of the second frequency response curve C2 is taken as 85 dB as an example.

In the frequency range from 500 Hz to 3 KHz (low frequency), the second frequency response curve C2 is located above the first frequency response curve C1. In the frequency range, the decibel value of the response of the first frequency response curve C1 is taken as 85 dB as an example, and the decibel value of the response of the second frequency response curve C2 is taken as 110 dB as an example. It can be seen from FIG. 4A that in the frequency range from 500 Hz to 3 KHz (low frequency), the microphone 120 is greatly interfered by non-linear transmitted sound energy.

Figure 4B:
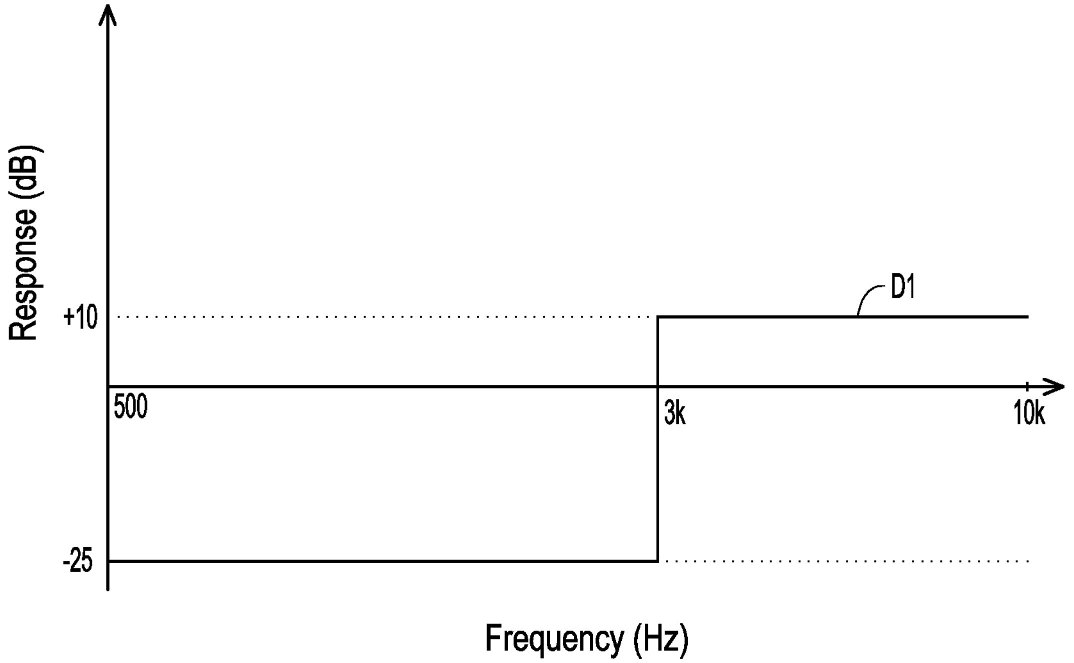
FIG. 4B is a simple schematic diagram of the first airtight numerical curve.

After the audio processor 110 obtains the first frequency response curve C1 and the second frequency response curve C2, FIG. 4B is a simple schematic diagram of a first airtight numerical curve. Refer to FIG. 4B, which illustrates a first airtight numerical curve D1 obtained by the audio processor 110 (FIG. 1) according to a numerical difference value between the first frequency response curve C1 and the second frequency response curve C2.

It can be seen from FIG. 4B that the first airtight numerical curve D1 is a curve generated by subtracting the first frequency response curve C1 and the second frequency response curve C2. In the frequency range from 500 Hz to 3 KHz (low frequency), the decibel value of the response of the first airtight numerical curve D1 is taken −25 dB as an example. In the frequency range from 3 KHz to 10 KHz (high frequency), the decibel value of the response of the first airtight numerical curve D1 is taken 10 dB as an example.

Next, step 220 of FIG. 2 is performed, and the audio processor 110 obtains an adjusted second frequency response curve C2' (FIG. 4C) by executing the first dynamic correction sound reception program. Specifically, the first dynamic correction sound reception program includes: in at least one frequency range in which the decibel value is a negative number in the first airtight numerical curve D1, the audio processor 110 reduces the decibel value of the second frequency response curve C2 in the at least one frequency range and obtains the adjusted second frequency response curve C2'; the decibel value of the adjusted second frequency response curve C2' in at least one frequency range is less than or equal to the decibel value of the first frequency response curve C1 in the corresponding at least one frequency range.

Figure 4C:
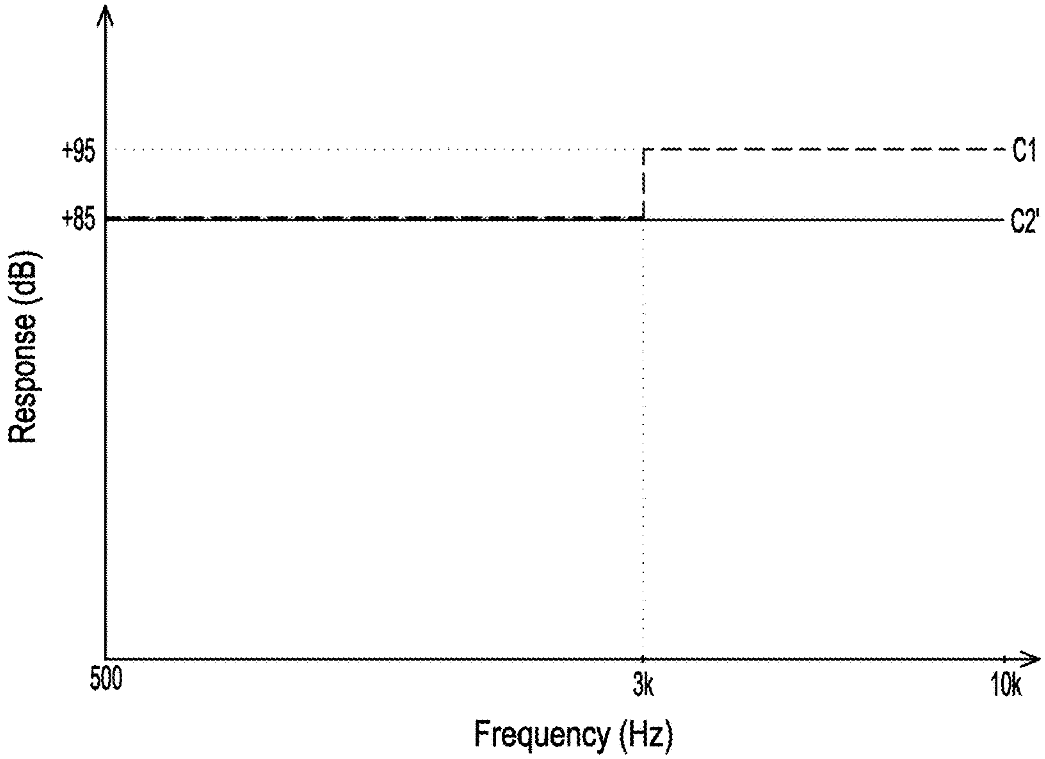
FIG. 4C is a simple schematic diagram of a first frequency response curve and an adjusted second frequency response curve in FIG. 4B.

FIG. 4C is a simple schematic diagram of a first frequency response curve and an adjusted second frequency response curve in FIG. 4B. Referring to FIGS. 4B and 4C, after obtaining the first airtight numerical curve D1, it can be seen that the decibel value of the first airtight numerical curve D1 in the frequency range from 500 Hz to 3 KHz (low frequency) is a negative value.

Therefore, the audio processor 110 reduces the decibel value of the second frequency response curve C2 in the frequency range of 500 Hz to 3 KHz (low frequency), so that the decibel value of the adjusted second frequency response curve C2' in the frequency range is less than or equal to the decibel value of the first frequency response curve C1 in the frequency range. In the embodiment illustrated in FIG. 4C, the decibel value of the adjusted second frequency response curve C2' in the frequency range of 500 Hz to 3 KHz is equal to the decibel value of the first frequency response curve C1 in the frequency range of 500 Hz to 3 KHz. In this way, the degree of interference of the microphone 120 by the non-linear transmitted sound energy in the frequency range may be reduced.

After experiments, the decibel value of the adjusted second frequency response curve C2' in the at least one frequency range is 0 to 15 decibels smaller than the decibel value of the first frequency response curve C1 in the corresponding at least one frequency range, which may effectively reduce the degree of interference of the microphone 120 by the non-linear transmitted sound energy in the at least on frequency range, so that the microphone 120 has a good sound reception effect without distortion.

As can be seen from FIG. 4C, the first frequency response curve C1 is still the original curve, and the adjusted second frequency response curve C2' is the result of the original second frequency response curve C2 minus the first airtight numerical curve D1 in the frequency range from 500 Hz to 3 KHz (low frequency).

It can be clearly seen from FIG. 4C that the decibel value of the adjusted second frequency response curve C2' in the frequency range from 500 Hz to 3 KHz (low frequency) is the same as the decibel value of the first frequency response curve C1. Therefore, in the frequency range of 500 Hz to 3 KHz (low frequency), the influence of the adjusted second frequency response curve C2' on the first frequency response curve C1 may be effectively reduced. The microphone 120 may perform better without being affected by the non-linear transmitted sound energy.

In addition, as shown in FIGS. 4A and 4C, since the first frequency response curve C1 is originally located above the original second frequency response curve C2 in the frequency range from 3 KHz to 10 KHz (high frequency), thereby being less affected by the non-linear transmitted sound energy. Therefore, the adjusted second frequency response curve C2' may still maintain the original decibel value in the frequency range from 3 KHz to 10 KHz (high frequency).

Figure 4D:
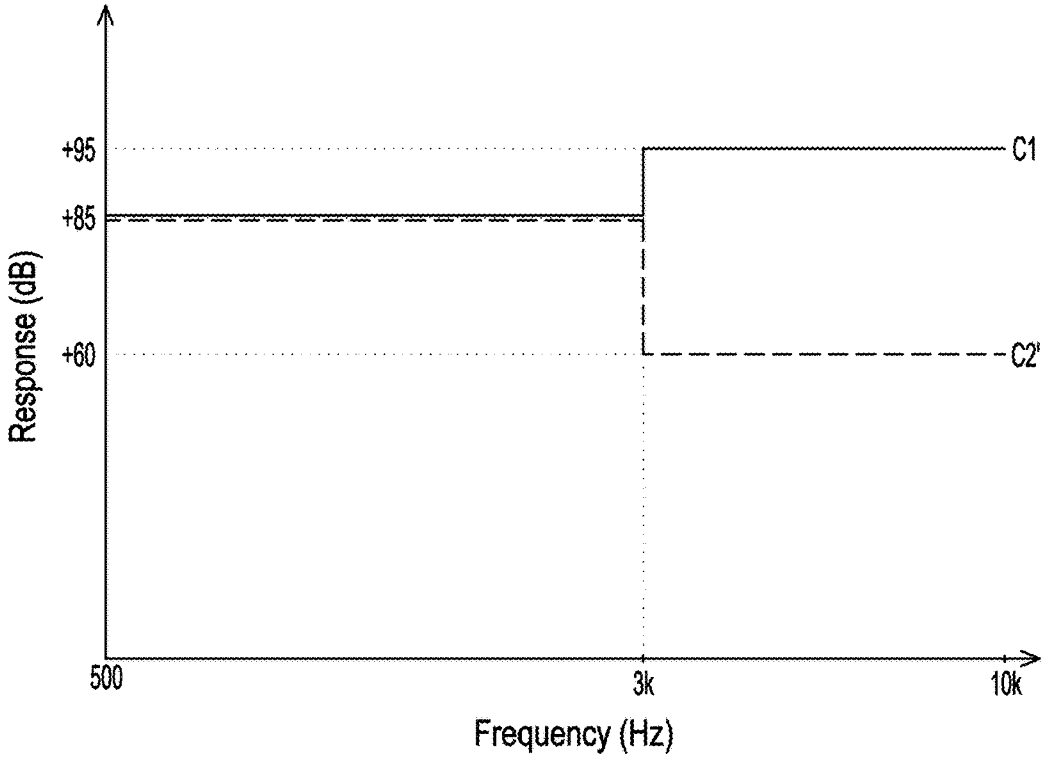
FIG. 4D is another simple schematic diagram of a first frequency response curve and an adjusted second frequency response curve of FIG. 4B.

Of course, the adjusted second frequency response curve C2' is not limited thereto. FIG. 4D is another simple schematic diagram of a first frequency response curve and an adjusted second frequency response curve of FIG. 4B. Referring to FIGS. 4A, 4B and 4D, the main difference between the adjusted second frequency response curve C2' of FIG. 4D and the adjusted second frequency response curve C2' of FIG. 4C is that in FIG. 4D, the adjusted second frequency response curve C2' is the result of subtracting the maximum negative value in the first airtight numerical curve D1 (FIG. 4B) from the original second frequency response curve C2 (FIG. 4A) of the full frequency range. As can be seen from FIG. 4D, in the full frequency range, the first frequency response curve C1 is located above the adjusted second frequency response curve C2', so that the microphone 120 may be less affected by the non-linear transmitted sound energy.

In an embodiment, if at least one frequency range of the second frequency response curve C2 located below the first frequency response curve C1 is multiple frequency ranges. The audio processor 110 may respectively reduce the decibel values of the second frequency response curve C2 in the frequency ranges according to multiple difference values between the first frequency response curve C1 and the second frequency response curve C2 in the frequency ranges to obtain the adjusted second frequency response curve C2'.

Figure 4E:
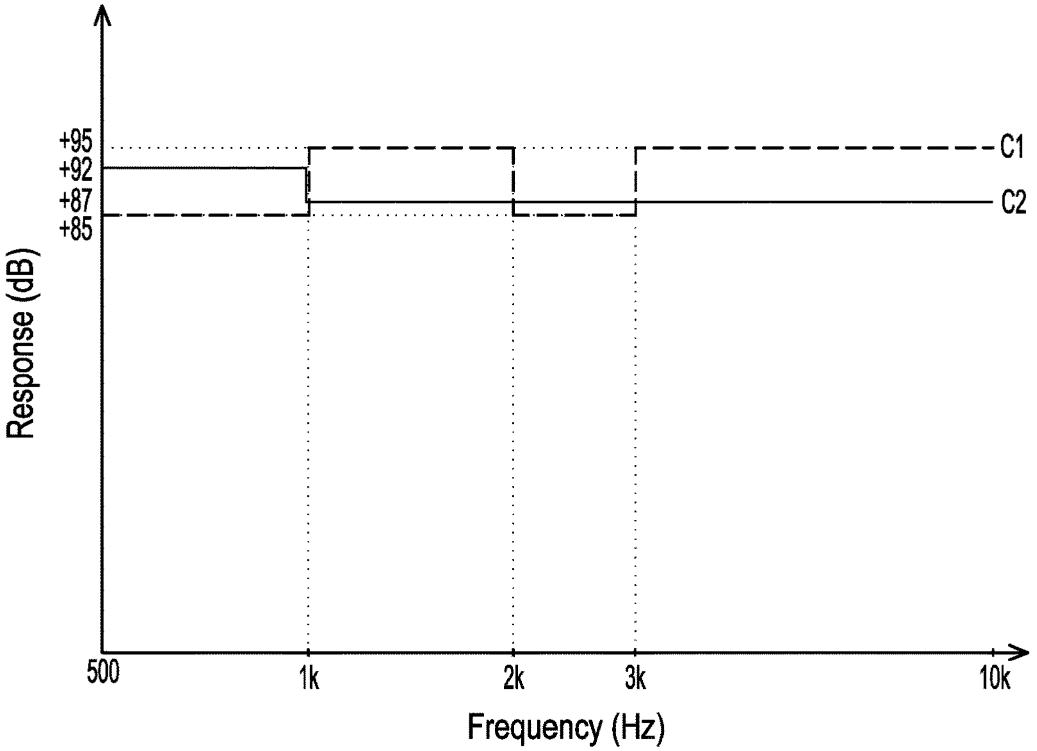
FIG. 4E is another simple schematic diagram of a first frequency response curve and a second frequency response curve when the first speaker is operating.

For example, FIG. 4E is another simple schematic diagram of a first frequency response curve and a second frequency response curve when the first speaker is operating. Referring to FIG. 4E, the second frequency response curve C2 is located above the first frequency response curve C1 in the two frequency ranges of 500 Hz to 1 KHz and 2 KHz to 3 KHz. Specifically, in the frequency range from 500 Hz to 1 KHz, the decibel value of the response of the second frequency response curve C2 is 92 dB, and the decibel value of the response of the first frequency response curve C1 is 85 dB. In the frequency range of 2 KHz to 3 KHz, the decibel value of the response of the second frequency response curve C2 is 87 dB, and the decibel value of the response of the first frequency response curve C1 is 85 dB.

Figure 4F:
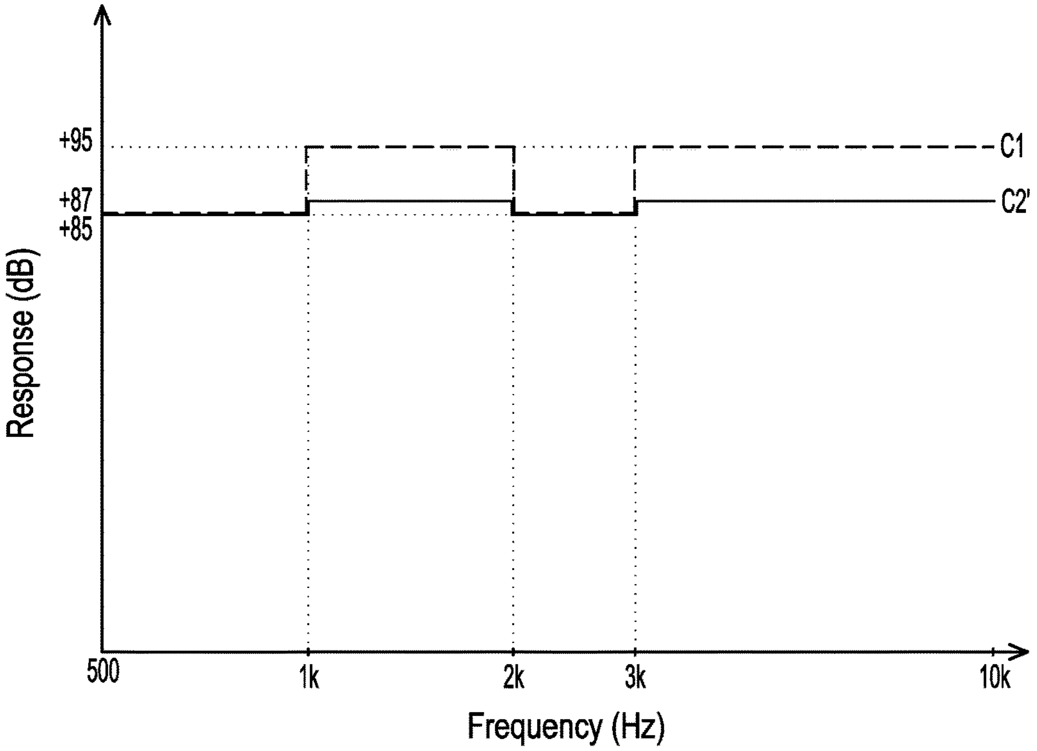
FIG. 4F is a simple schematic diagram of a first frequency response curve and an adjusted second frequency response curve of FIG. 4E.

FIG. 4F is a simple schematic diagram of a first frequency response curve and an adjusted second frequency response curve of FIG. 4E. Referring to FIGS. 4E and 4F, the audio processor 110 may reduce the second frequency response curve C2 by 7 dB in the frequency range from 500 Hz to 1 KHz, and by 2 dB in the frequency range from 2 KHz to 3 KHz, so that the adjusted second frequency response curve C2' may not be located above the first frequency response curve C1 in the full frequency range. Taking FIG. 4F as an example, the adjusted second frequency response curve C2' overlaps the first frequency response curve C1 in the frequency range from 500 Hz to 1 KHz and the frequency range from 2 KHz to 3 KHz, and the adjusted second frequency response curve C2' is located below the first frequency response curve C1 in the frequency range of 1 KHz to 2 KHz and the frequency range of 3 KHz to 10 KHz.

Of course, in an embodiment, the audio processor 110 reduces the decibel values of the second frequency response curve C2 in the frequency ranges according to a maximum difference value among multiple difference values between the first frequency response curve C1 and the second frequency response curve C2 in the frequency ranges to obtain the adjusted second frequency response curve C2'.

Figure 4G:
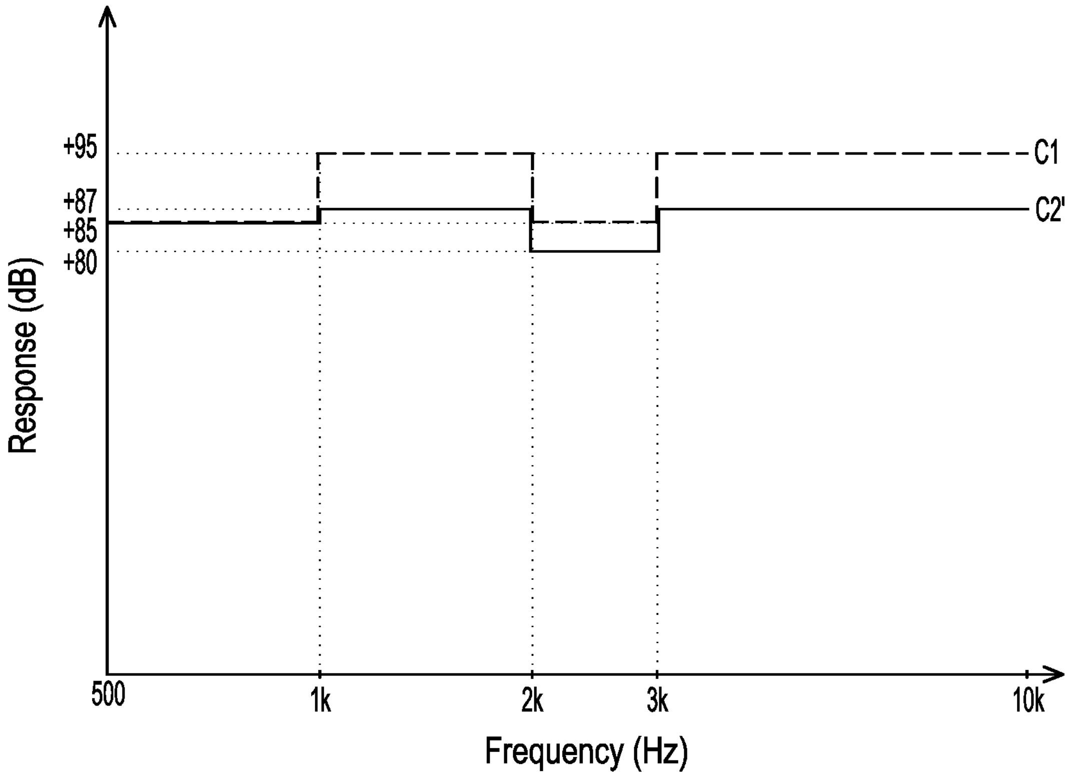
FIG. 4G is another simple schematic diagram of a first frequency response curve and an adjusted second frequency response curve of FIG. 4E.

For example, FIG. 4G is another simple schematic diagram of a first frequency response curve and an adjusted second frequency response curve of FIG. 4E. Referring to FIGS. 4E and 4G, the audio processor 110 may reduce the second frequency response curve C2 by 7 dB in both the frequency range from 500 Hz to 1 KHz and the frequency range from 2 KHz to 3 KHz, so that the adjusted second frequency response curve C2' cannot be located above the first frequency response curve C1 in the full frequency range. Taking FIG. 4G as an example, the adjusted second frequency response curve C2' overlaps the first frequency response curve C1 in the frequency range of 500 Hz to 1 KHz, and the adjusted second frequency response curve C2' is located below the first frequency response curve C1 in the frequency range of 1 KHz to 10 KHz.

Of course, although in FIGS. 4F and 4G, the adjusted second frequency response curve C2' has not been adjusted in the frequency ranges outside the frequency range from 500 Hz to 1 KHz and the frequency range 2 KHz to 3 KHz, in other embodiments, the adjusted second frequency response curve C2' may also be adjusted in the full frequency range as shown in FIG. 4D, and is not limited by the drawings.

Refer to FIG. 1 again. In the embodiment, the electronic device 100 may further include a storage 140, which is electrically connected to the audio processor 110. The storage 140 is, for example, a memory or a hard disk. The storage 140 is configured to store the first frequency response curve C1, the second frequency response curve C2, the first airtight numerical curve D1 and the adjusted second frequency response curve C2' for dynamic correction by the audio processor 110.

In addition, in other embodiments, the electronic system 10 further includes a second speaker 30. In the embodiment, the second speaker 30 is located outside the electronic device 100 and is an external speaker or an external sound source. Of course, in other embodiments, the electronic system 10 may also have one of the first speaker 150 and the second speaker 30 located in the electronic device 100, and the other may be located outside the electronic device 100. The positions of the first speaker 150 and the second speaker 30 are not limited to FIG. 1.

Similarly, although the second speaker 30 is located outside the electronic device 100, the microphone 120 will not only receive the sound entering from the sound hole 130, but also receive the sound energy (non-linear transmitted sound energy played by the second speaker 30) transmitted by the vibration of the housing and internal mechanical components of the electronic device 100.

Therefore, the audio processor 110 may also dynamically correct the sound emitted by the second speaker 30 in the same or similar manner, so that the microphone 120 can achieve good sound reception quality.

As shown in FIG. 2, the dynamic correction method 200 for sound reception may further optionally include step 230, where the audio processor 110 obtains a second airtight numerical curve according to a numerical difference value between a third frequency response curve C3 (FIG. 5) and a fourth frequency response curve C4 (FIG. 5) to execute a second dynamic correction sound reception program.

Specifically, as shown in step 232, when the sound reception hole 130 remains unobstructed, the microphone 120 receives the sound emitted by the second speaker 30 and obtains the third frequency response curve C3; when the sound reception hole 130 is closed, the microphone 120 receives the sound emitted by the second speaker 30 and obtains the fourth frequency response curve C4.

Next, in step 240, the audio processor 110 obtains an adjusted fourth frequency response curve by executing the second dynamic correction sound reception program. Furthermore, the execution content of step 240 is similar to the execution content of step 220. The difference between step 240 and step 220 is that step 240 executes a dynamic correction sound reception program according to the third frequency response curve C3 and the fourth frequency response curve C4.

Figure 5:
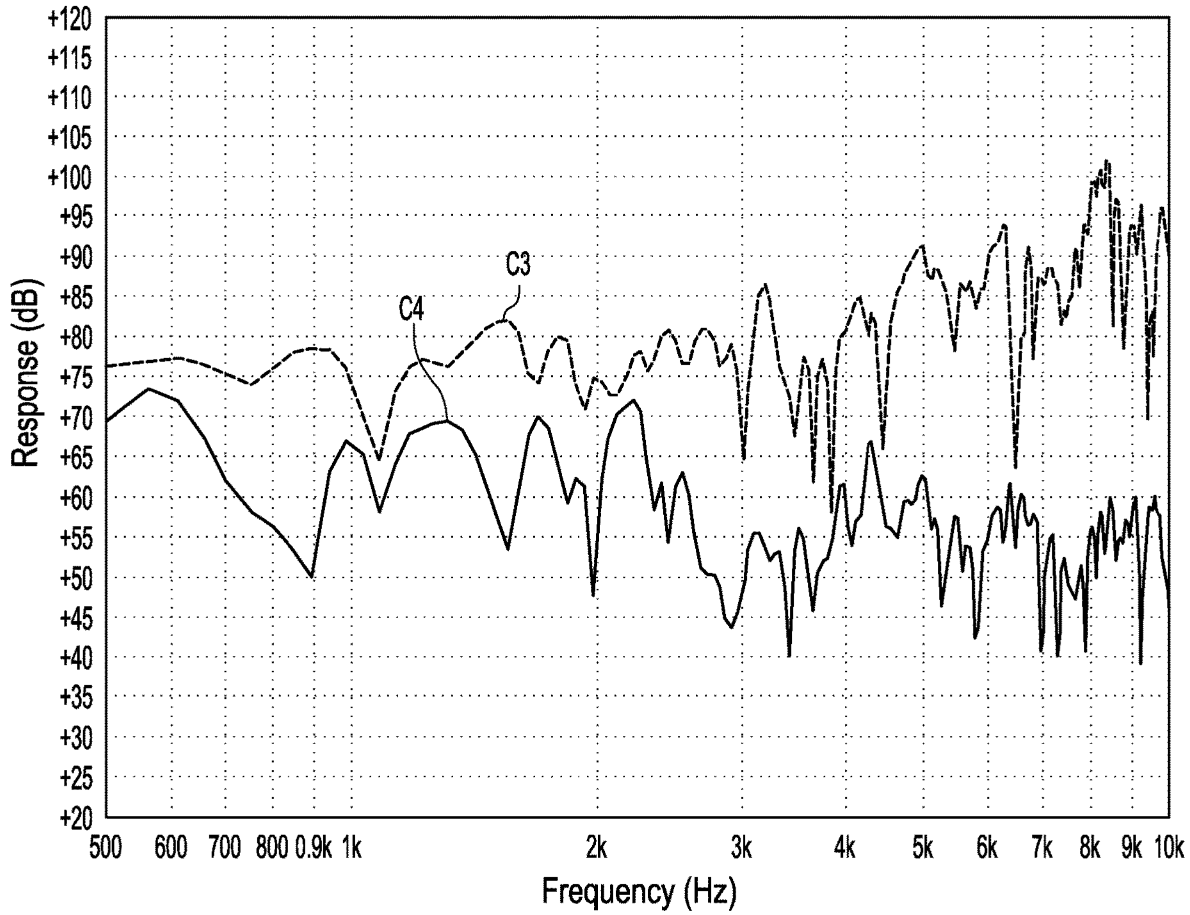
FIG. 5 is an actual measurement chart of the third frequency response curve and the fourth frequency response curve when the second speaker of the electronic system of FIG. 1 is operating.

FIG. 5 is an actual measurement chart of the third frequency response curve and the fourth frequency response curve when the second speaker of the electronic system of FIG. 1 is operating. Referring to FIG. 5, in the embodiment, the third frequency response curve C3 is located above the fourth frequency response curve C4 in the full frequency range, which means that the microphone 120 is relatively less interfered by the non-linear transmitted sound energy, so the fourth frequency response Curve C4 may not need to be adjusted.

In other embodiments, if the fourth frequency response curve C4 is located above the third frequency response curve C3 in part of the frequency range, the audio processor 110 may execute the second dynamic correction sound reception program. It should be noted that the execution mode of the second dynamic correction sound reception program is similar to the execution mode of the first dynamic correction sound reception program. For detailed methods, refer to FIGS. 4A to 4G. That is to say, the execution content of step 240 is similar to the execution content of step 220, so the following is merely described in text.

The second dynamic correction sound reception program includes: in at least one frequency range in which the decibel value is a negative number in the second airtight value curve, the audio processor 110 reduces the decibel value of the fourth frequency response curve C4 in the at least one frequency range and obtains the adjusted fourth frequency response curve; the decibel value of the adjusted fourth frequency response curve is less than or equal to the decibel value of the third frequency response curve C3 in the corresponding at least one frequency range.

In an embodiment, in the second dynamic correction sound reception program, the decibel value of the adjusted fourth frequency response curve in the at least one frequency range is 0 to 15 decibels smaller than the decibel value of the third frequency response curve C3 in the corresponding at least one frequency range, which enables the microphone 120 to have a good sound reception effect.

In addition, in an embodiment, if at least one frequency range that needs to be adjusted in the fourth frequency response curve C4 is multiple frequency ranges, the audio processor 110 respectively reduces the decibel values of the fourth frequency response curve C4 in the frequency ranges according to multiple difference values between the third frequency response curve C3 and the fourth frequency response curve C4 in the frequency ranges to obtain the adjusted fourth frequency response curve.

In another embodiment, the audio processor 110 may also reduce the decibel values of the fourth frequency response curve C4 according to a maximum difference value among multiple difference values between the third frequency response curve C3 and the fourth frequency response curve C4 in the frequency ranges to obtain the adjusted fourth frequency response curve. The above-mentioned storage 140 may also be configured to store the third frequency response curve C3, the fourth frequency response curve C4, the second airtight numerical curve and the adjusted fourth frequency response curve for dynamic correction by the audio processor 110.

It is worth mentioning that if the microphone 120 receives the sound from the first speaker 150 and the sound from the second speaker 30 at the same time, the audio processor 110 may first suppress the sound of one of the speakers (for example, the first speaker 150), and then dynamically correct the sound of the other speaker (for example, the second speaker 30). The audio processor 110 may subsequently suppress the sound of the other speaker (for example, the second speaker 30) and dynamically correct the sound of the originally unprocessed speaker (for example, the first speaker 150).

The electronic system 10 of the embodiment may adopt the dynamic correction method 200 for sound reception. In the production line, each of the electronic devices 100 may actually measure the first frequency response curve C1 and the second frequency response curve C2 of the microphone 120, and the first airtight numerical curve D1 and the adjusted second frequency response curve C2' may be calculated by the audio processor 110 and stored in the storage 140. Next, the audio processor 110 reads the numerical values from the storage 140, calculates and performs dynamic correction to eliminate or reduce the influence of the non-linear transmitted sound energy in the interior of the electronic device 100 transmitted to the microphone 120, thereby achieving the effect of reducing echo and optimizing the Acoustic Echo Cancellation (AEC) of a product.

Since each of the electronic devices 100 in the production line may ensure the AEC effect through the dynamic correction method 200 for sound reception, even if the production distribution variation causes the non-linear transmitted sound energy of one of the electronic devices 100 to be high, or even greater than normal sound reception, the electronic device 100 may also be dynamically corrected according to the first airtight numerical curve D1 measured by itself. Therefore, each of the electronic devices 100 may have good sound reception performance.

In addition, in the embodiment, since the electronic device 100 itself does not need to add a speaker shock-absorbing structure, and the membrane layer of the microphone 120 also does not need to be made of waterproof and highly transparent materials to reduce non-linear transmitted sound energy, the structure may be effectively simplified and the effect of cost saving may be achieved.

To sum up, in the electronic system and the dynamic correction method for sound reception of the disclosure, the audio processor obtains the first airtight numerical curve according to the numerical difference value between the first frequency response curve and the second frequency response curve to execute the first dynamic correction sound reception program, and the audio processor obtains the adjusted second frequency response curve by executing the first dynamic correction sound reception program. If the second frequency response curve is a curve that can reflect the non-linear transmitted sound energy, since the adjusted second frequency response curve has a relatively low impact on the first frequency response curve, the impact of non-linear transmitted sound energy on the sound reception effect caused by the non-linear transmitted sound energy may be effectively reduced without requiring additional material costs.

Although the disclosure has been described with reference to the above embodiments, the described embodiments are not intended to limit the disclosure. People of ordinary skill in the art may make some changes and modifications without departing from the spirit and the scope of the disclosure. Thus, the scope of the disclosure shall be subject to those defined by the attached claims.

What is claimed is:

1. A dynamic correction method for sound reception, adapted for an electronic device, wherein the electronic device comprises an audio processor, a microphone which is signally connected to the audio processor and a sound reception hole that corresponds to the microphone, the dynamic correction method for sound reception, comprising:

obtaining, by the audio processor, a first airtight numerical curve according to a numerical difference value between a first frequency response curve and a second frequency response curve to execute a first dynamic correction sound reception program; and obtaining, by the audio processor, an adjusted second frequency response curve by executing the first dynamic correction sound reception program to compensate for a non-linear transmitted sound energy that is transmitted from an interior of the electronic device to the microphone through an internal mechanical component of the electronic device.

2. The dynamic correction method for sound reception according to claim 1, wherein when the sound reception hole remains unobstructed, the microphone receives a sound emitted by a first speaker and obtains the first frequency response curve, and when the sound reception hole is closed, the microphone receives the sound emitted by the first speaker and obtains the second frequency response curve.

3. The dynamic correction method for sound reception according to claim 2, wherein the first speaker is disposed in the electronic device.

4. The dynamic correction method for sound reception according to claim 1, wherein the first dynamic correction sound reception program comprises: in at least one frequency range in which a decibel value is a negative number in the first airtight numerical curve, the audio processor reduces a decibel value of the second frequency response curve in the at least one frequency range and obtains the adjusted second frequency response curve, and a decibel value of the adjusted second frequency response curve in the at least one frequency range is less than or equal to a decibel value of the first frequency response curve in the at least one frequency range corresponding thereof.

5. The dynamic correction method for sound reception according to claim 4, wherein the decibel value of the adjusted second frequency response curve in the at least one frequency range is 0 to 15 decibels smaller than the decibel value of the first frequency response curve in the at least one frequency range corresponding thereof.

6. The dynamic correction method for sound reception according to claim 4, wherein the at least one frequency range comprises a plurality of frequency ranges, and the audio processor respectively reduces the decibel values of the second frequency response curve according to a plurality of difference values between the first frequency response curve and the second frequency response curve in the frequency ranges to obtain the adjusted second frequency response curve.

7. The dynamic correction method for sound reception according to claim 4, wherein the at least one frequency range comprises a plurality of frequency ranges, and the audio processor reduces the decibel values of the second frequency response curve in the frequency ranges according to a maximum difference value among a plurality of difference values between the first frequency response curve and the second frequency response curve in the frequency ranges to obtain the adjusted second frequency response curve.

8. The dynamic correction method for sound reception according to claim 1, further comprising:

when the sound reception hole remains unobstructed, receiving, by the microphone, a sound emitted by a second speaker and obtaining a third frequency response curve;

when the sound reception hole is closed, receiving, by the microphone, the sound emitted by the second speaker and obtaining a fourth frequency response curve;

obtaining, by the audio processor, a second airtight numerical curve according to a numerical difference value between the third frequency response curve and the fourth frequency response curve to execute a second dynamic correction sound reception program; and obtaining, by the audio processor, an adjusted fourth frequency response curve by executing the second dynamic correction sound reception program.

9. The dynamic correction method for sound reception according to claim 8, wherein the second dynamic correction sound reception program comprises: in at least one frequency range in which a decibel value is a negative number in the second airtight numerical curve, the audio processor reduces a decibel value of the fourth frequency response curve in the at least one frequency range to obtain the adjusted fourth frequency response curve, and a decibel value of the adjusted fourth frequency response curve in the at least one frequency range is less than or equal to a decibel value of the third frequency response curve in the at least one frequency range corresponding thereof.

10. The dynamic correction method for sound reception according to claim 9, wherein in the second dynamic correction sound reception program, the decibel value of the adjusted fourth frequency response curve in the at least one frequency range is 0 to 15 decibels smaller than the decibel value of the third frequency response curve in the at least one frequency range corresponding thereof.

11. The dynamic correction method for sound reception according to claim 9, wherein the at least one frequency range comprises a plurality of frequency ranges, and the audio processor respectively reduces the decibel values of the fourth frequency response curve in the frequency ranges according to a plurality of difference values between the third frequency response curve and the fourth frequency response curve in the frequency ranges to obtain the adjusted fourth frequency response curve.

12. The dynamic correction method for sound reception according to claim 9, the at least one frequency range comprises a plurality of frequency ranges, and the audio processor reduces the decibel values of the fourth frequency response curve in the frequency ranges according to a maximum difference value among a plurality of difference values between the third frequency response curve and the fourth frequency response curve in the frequency ranges to obtain the adjusted fourth frequency response curve.

13. The dynamic correction method for sound reception according to claim 8, wherein one of the first speaker and the second speaker is located in the electronic device, and the other is located outside the electronic device.

14. An electronic system, comprising:

an electronic device, comprising:

an audio processor;

a microphone, signally connected to the audio processor; and a sound reception hole, corresponding to the microphone, wherein the audio processor obtains a first airtight numerical curve according to a numerical difference value between a first frequency response curve and a second frequency response curve to execute a first dynamic correction sound reception program and obtain an adjusted second frequency response curve to compensate for a non-linear transmitted sound energy that is transmitted from an interior of the electronic device to the microphone through an internal mechanical component of the electronic device.

15. The electronic system according to claim 14, further comprising:

a first speaker, wherein when the sound reception hole remains unobstructed, the microphone receives a sound emitted by the first speaker and obtains the first frequency response curve, and when the sound reception hole is closed, the microphone receives the sound emitted by the first speaker and obtains the second frequency response curve.

16. The electronic system according to claim 15, further comprising:

a second speaker, one of the first speaker and the second speaker being located in the electronic device, the other being located outside the electronic device, when the sound reception hole remains unobstructed, the microphone receiving a sound emitted by the second speaker, so that the audio processor obtains a third frequency response curve, when the sound reception hole is closed, the microphone receiving the sound emitted by the second speaker, so that the audio processor obtains a fourth frequency response curve, and the audio processor obtaining a second airtight numerical curve according to a numerical difference value between the third frequency response curve and the fourth frequency response curve to execute a second dynamic correction sound reception program and obtain an adjusted fourth frequency response curve.

17. The electronic system according to claim 16, wherein in at least one frequency range in which a decibel value is a negative number in the second airtight numerical curve, the audio processor reduces a decibel value of the fourth frequency response curve in the at least one frequency range to obtain the adjusted fourth frequency response curve, and a decibel value of the adjusted fourth frequency response curve in the at least one frequency range is less than or equal to a decibel value of the third frequency response curve in the at least one frequency range corresponding thereof.

18. The electronic system according to claim 17, wherein the audio processor makes the decibel value of the adjusted fourth frequency response curve in the at least one frequency range 0 to 15 decibels smaller than the decibel value of the third frequency response curve in the at least one frequency range corresponding thereof.

19. The electronic system according to claim 16, further comprising:

a remote device, signally connected to the audio processor, and the audio processor receiving a sound signal from the remote device and transmitting the sound signal to the first speaker or the second speaker in the electronic device for playing.

20. The electronic system according to claim 14, wherein in at least one frequency range in which a decibel value is a negative number in the first airtight numerical curve, the audio processor reduces a decibel value of the second frequency response curve in the at least one frequency range to obtain the adjusted second frequency response curve, and a decibel value of the adjusted second frequency response curve in the at least one frequency range is less than or equal to a decibel value of the first frequency response curve in the at least one frequency range corresponding thereof.

21. The electronic system according to claim 20, wherein the audio processor makes the decibel value of the adjusted second frequency response curve in the at least one frequency range 0 to 15 decibels smaller than the decibel value of the first frequency response curve in the at least one frequency range corresponding thereof.

22. The electronic system according to claim 14, wherein the electronic device comprises a storage, which is electrically connected to the audio processor, and the storage is configured to store the first airtight numerical curve.

* * * * *